(12) United States Patent
Vinson et al.

(10) Patent No.: US 7,382,613 B2
(45) Date of Patent: Jun. 3, 2008

(54) COMPUTER SYSTEM WITH EXTERNAL AIR MOVER

(75) Inventors: Wade D. Vinson, Magnolia, TX (US); Christopher A. Taylor, Spring, TX (US); Christian L. Belady, McKinney, TX (US); Eric C. Peterson, McKinney, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 11/132,922

(22) Filed: May 19, 2005

(65) Prior Publication Data

US 2005/0259392 A1  Nov. 24, 2005

Related U.S. Application Data

(60) Provisional application No. 60/573,661, filed on May 21, 2004.

(51) Int. Cl.
*G06F 1/20* (2006.01)
(52) U.S. Cl. .................. 361/687; 361/695; 454/184
(58) Field of Classification Search ........ 361/687, 361/694, 695; 454/184
See application file for complete search history.

(56) References Cited

U.S. PATENT DOCUMENTS

| | | | |
|---|---|---|---|
| 4,744,005 A | * | 5/1988 | Milani ................. 361/687 |
| 5,562,410 A | * | 10/1996 | Sachs et al. ........... 415/213.1 |
| 6,031,721 A | | 2/2000 | Bhatia |
| 6,262,892 B1 | | 7/2001 | Bhatia |
| 6,299,408 B1 | | 10/2001 | Bhatia |
| 6,496,366 B1 | * | 12/2002 | Coglitore et al. ........ 361/687 |
| 6,535,382 B2 | * | 3/2003 | Bishop et al. ........... 361/690 |
| 6,867,966 B2 | * | 3/2005 | Smith et al. ............ 361/687 |
| 6,867,967 B2 | * | 3/2005 | Mok ..................... 361/687 |
| 6,896,611 B2 | * | 5/2005 | Giraldo et al. .......... 454/184 |
| 6,927,980 B2 | * | 8/2005 | Fukuda et al. .......... 361/700 |
| 7,088,581 B2 | * | 8/2006 | Modica .................. 361/687 |
| 2003/0153259 A1 | | 8/2003 | Lee et al. |
| 2003/0155106 A1 | | 8/2003 | Malone et al. |
| 2003/0169567 A1 | | 9/2003 | Tantoush et al. |
| 2003/0184972 A1 | | 10/2003 | Saeki et al. |
| 2003/0202878 A1 | | 10/2003 | Huang et al. |
| 2004/0004813 A1 | | 1/2004 | Coglitore et al. |
| 2004/0246676 A1 | | 12/2004 | Barr et al. |

* cited by examiner

*Primary Examiner*—Lisa Lea-Edmonds

(57) ABSTRACT

A computer system comprising a chassis supporting a processor, memory, and a power supply. An inlet allows air to flow into the chassis and an outlet allows air to flow out of the chassis. An air mover is operable to generate an airflow through said chassis between the inlet and the outlet and in thermal communication with the processor, memory, and power supply. The air mover is disposed external to said chassis.

23 Claims, 4 Drawing Sheets

COMPUTER SYSTEM WITH EXTERNAL AIR MOVER

CROSS-REFERENCE TO A RELATED APPLICATION

The present application claims the benefit of, and incorporates by reference, provisional application Serial No. 60/573,661, filed May 21, 2004, and entitled "Server that Exhausts Heat to CRAC Return or Outside the Data Center."

BACKGROUND

Computer system designs that seek to increase computational power while reducing the size of computer equipment create many challenges with controlling the temperature within these 'dense' computer systems. Increasing the computational power of computer systems often results in the utilization of high power components that generate high levels of heat. Reducing the size of the computer system often involves packaging components in close proximity to each other, therefore restricting airflow through the system. The combination of high power, high heat generating components and compact design is pushing the limits of current air-cooled systems.

Air-cooled systems often utilize an array of fans to move air from the environment, through a computer chassis, and back to the environment. As the air passes through the enclosure it comes in thermal contact with, and absorbs heat from, the heat generating components within the enclosure. The heat transfer rate that can be achieved by an air-cooled system is a function of the volumetric flow rate and static pressure of air that can be moved through the chassis.

The performance of many air-cooled systems is also dependent on the temperature of air available to the system. As the temperature of air drawn into an air-cooled system increases, the amount of heat that the air can absorb decreases, thus decreasing the effectiveness of the cooling system. This is often of particular concern in data centers and other installations where large concentrations of dense computer systems operate.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

In the following discussion and in the claims, the term "thermal communication" is intended to describe a relationship between two things characterized by capability of a transfer of thermal energy. This transfer can be by any of thermal transfer mode and may be direct contact, indirect transfer, or through other components, such as a heat sink.

In the following discussion and in the claims, the term "air director" is intended to describe any structure that directs a flow of air. An air director may be a duct, plenum, wall, channel, guide vane, fin, or any other structure that directs or otherwise influences the flow of air.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
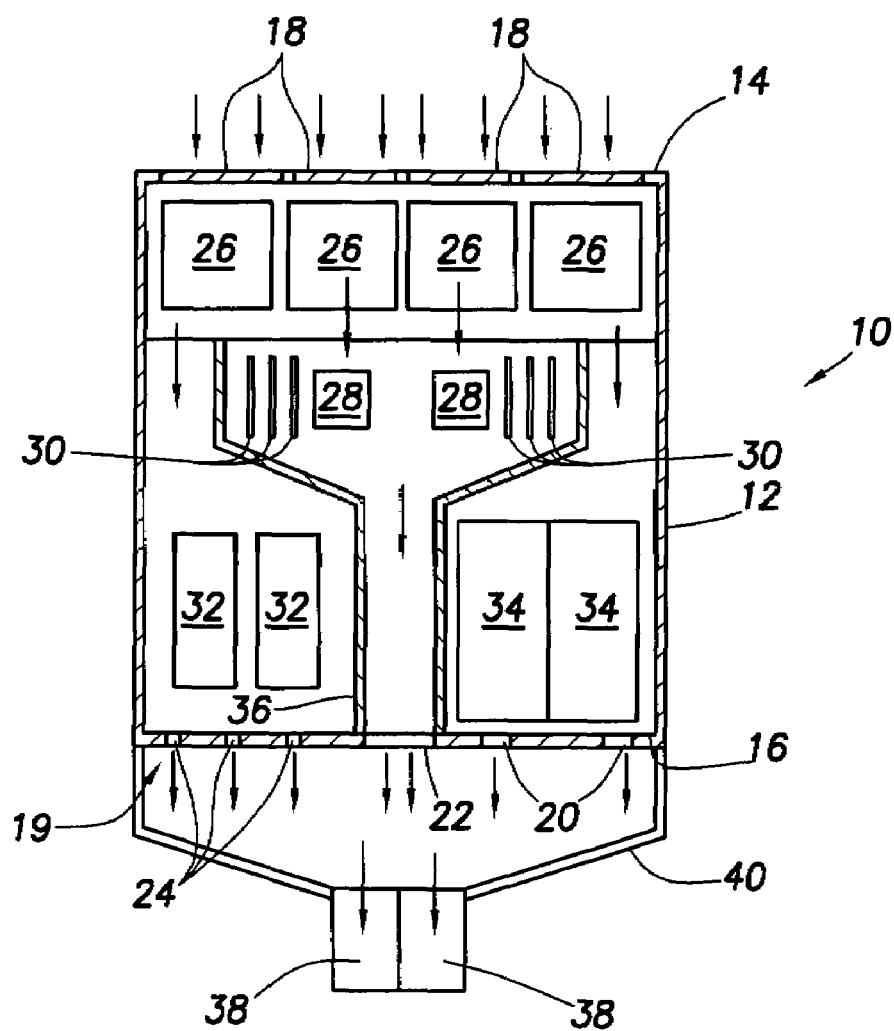
FIG. 1 shows a computer system constructed in accordance with embodiments of the invention.

FIG. 1 shows computer system 10 comprising chassis 12. Chassis 12 comprises front end 14, back end 16, inlets 18, and outlet 19 that comprises exhaust ports 20, 22, and 24. Disposed within chassis 12 are a variety of electronic components such as hard drives 26, processors 28, memory modules 30, interface cards 32, and power supplies 34. Air director 36 is disposed within chassis 12. Air movers 38 are connected to back end 16 of chassis 12 via exhaust plenum 40.

Air movers 38 generate a high flow rate, high static pressure airflow through chassis 12 that flows through inlets 18 into the interior of the chassis. Air director 36 divides chassis 12 into three separate flow zones and divides the airflow in separate streams that travel through the zones. Airflow in the first zone passes in thermal communication with interface cards 32 and exits chassis 12 through exhaust ports 24. Airflow in the second zone passes in thermal communication with processors 28 and memory modules 30 before exiting chassis 12 through exhaust port 22. Airflow in the third zone passes in thermal communication with power supplies 34 and exits chassis 12 through exhaust ports 20. Although illustrated with three flow zone, it is understood that chassis 12 may be divided into as many flow zones as are desired to effectively cool the computer system.

Figure 2:
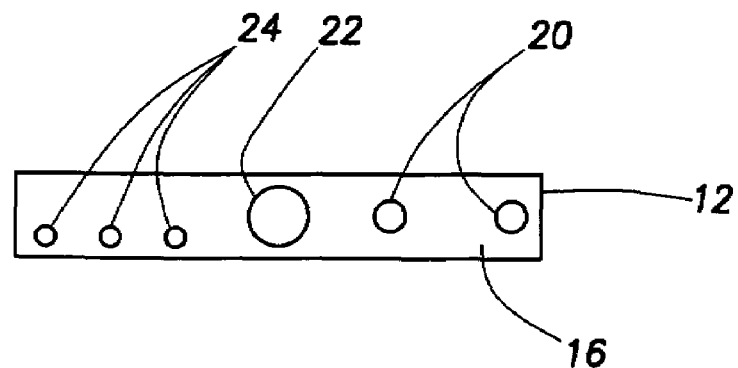
FIG. 2 shows a back end view of the computer system of FIG. 1.

As can be seen in FIG. 2, exhaust ports 20, 22, and 24 have different sizes and configurations. In particular, exhaust port 22 provides a greater flow area than exhaust ports 20 and 24. As the size of the flow area increases so does the volume of airflow that can be moved through the particular port. Thus, by varying the size of the exhaust ports, the flow through chassis 12 can be configured so as to provide more airflow, and thus higher cooling capacity, to selected components within the chassis. Exhaust ports 20, 22, and 24 may be sized and arranged on back end 16 such that the back end is generally available for supporting cables and other connections.

Exhaust plenum 40 provides a fluid conduit from exhaust ports 20, 22, and 24 to air movers 38. Placement of air movers 38 external to chassis 12 removes the positioning of the air mover from the design constraints of computer system 10. An externally mounted air mover also allows easy service access to the air mover as well as opportunity to dampen and isolate the air mover in order to reduce noise generated by the air mover.

Figure 3:
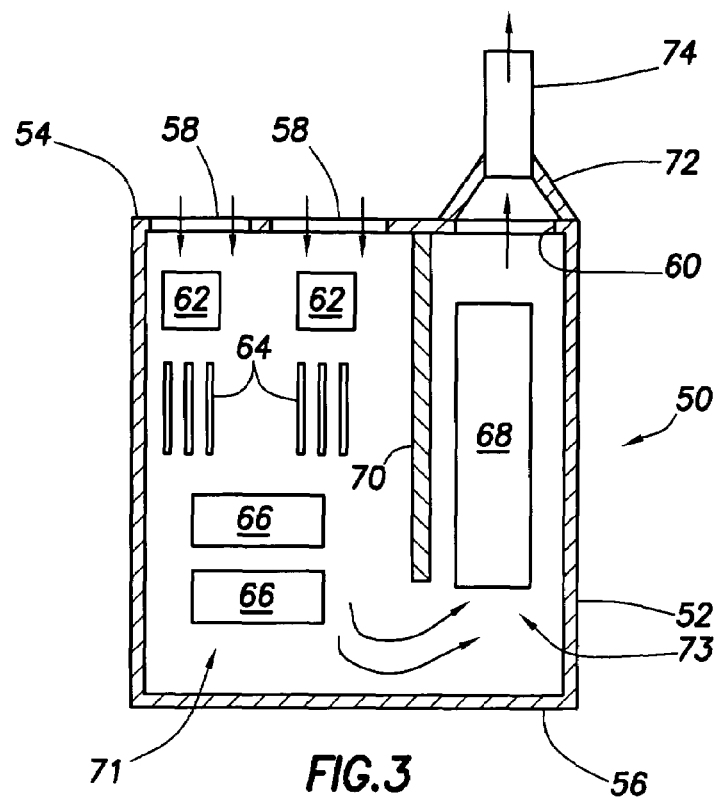
FIG. 3 shows a computer system constructed in accordance with embodiments of the invention.

Referring now to FIG. 3 computer system 50 comprises chassis 52 having front end 54 and back end 56. Inlets 58 and outlet 60 are disposed through front end 54. Chassis 52 supports processors 62, memory modules 64, interface cards 66, and power supply 68. Chassis 52 also comprises air director 70 that divides the chassis into a first flow area 71 and a second flow area 73. Exhaust plenum 72 couples air mover 74 to outlet 60.

Air mover 74 generates a high flow rate, high static pressure airflow through chassis 52 that enters through inlets 58. The airflow travels toward back end 56 passing through first flow area 71 in thermal communication with processors 62, memory modules 64, and interface cards 66. As the airflow reaches back end 56, it is redirected around the end of air director 70 toward front end 54. As the airflow travels through second flow area 73 it passes in thermal communication with power supply 68. The airflow is drawn through outlet 60 and exhaust plenum 72 to air mover 74 that is external to chassis 12.

Figure 4:
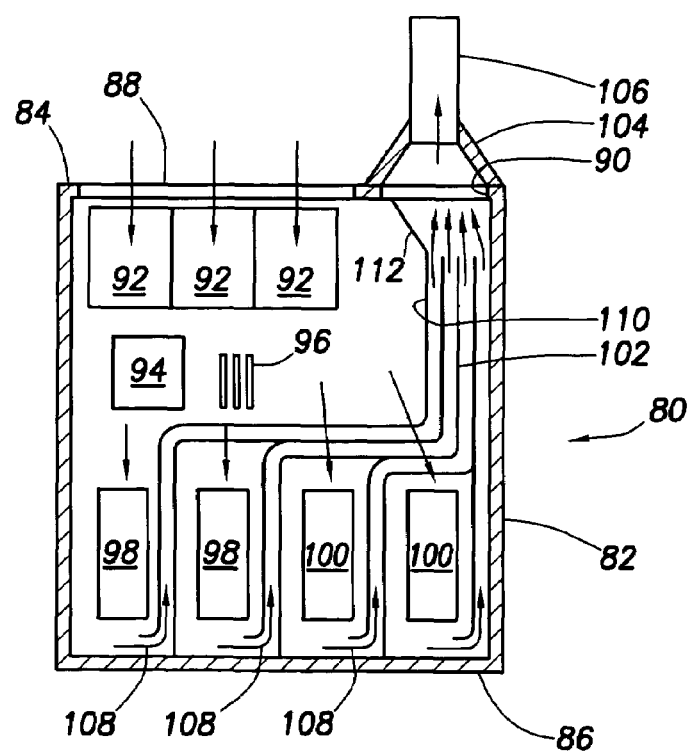
FIG. 4 shows a computer system constructed in accordance with embodiments of the invention.

Referring now to FIG. 4, computer system 80 comprises chassis 82 having front end 84 with inlet 88 and outlet 90. Chassis 82 supports electronic components including hard drives 92, processor 94, memory modules 96, expansion cards 98, and power supplies 100. Air director 102 is disposed within chassis 82 and comprises inlets 108 disposed near back end 86 of the chassis and flow conduits 110 providing a path for airflow between inlets 108 and chassis outlet 90. Exhaust plenum 104 couples air mover 106 to chassis outlet 90.

Air mover 106 generates a high flow rate, high static pressure airflow that draws air into chassis through chassis inlet 88. The airflow passes in thermal communication with the electronic components as it travels toward back end 86. The airflow is drawn into air director inlets 108 at back end 86 and travels toward chassis outlet 90 through conduits 110. The airflow is drawn through chassis outlet 90 and through exhaust plenum 104 by air mover 106 that is external to chassis 82.

By positioning the chassis inlets and outlets on the front of chassis, the back end of the chassis is made freely available for cables and other connections. Because only one side of the chassis is used to support the airflow, restrictions on the placement of the system are minimized. In certain embodiments, the air mover could be disposed within the chassis but the warm exhaust must be controlled to prevent mixing with the air being drawn into the chassis. The flow through the chassis could also be reversed with the air mover providing an airflow to the chassis.

In large data centers and other installations having high concentrations of dense computer systems, providing sufficient cooling for the entire system is a concern. In many installations, the warm exhaust is simply dumped directly back into the room where it mixes with the ambient air. Heavy duty air conditioning systems are utilized to maintain the ambient air at a temperature suitable for cooling. Having an externally mounted air mover provides flexibility in managing the warm exhaust from the air cooling systems.

Figure 5:
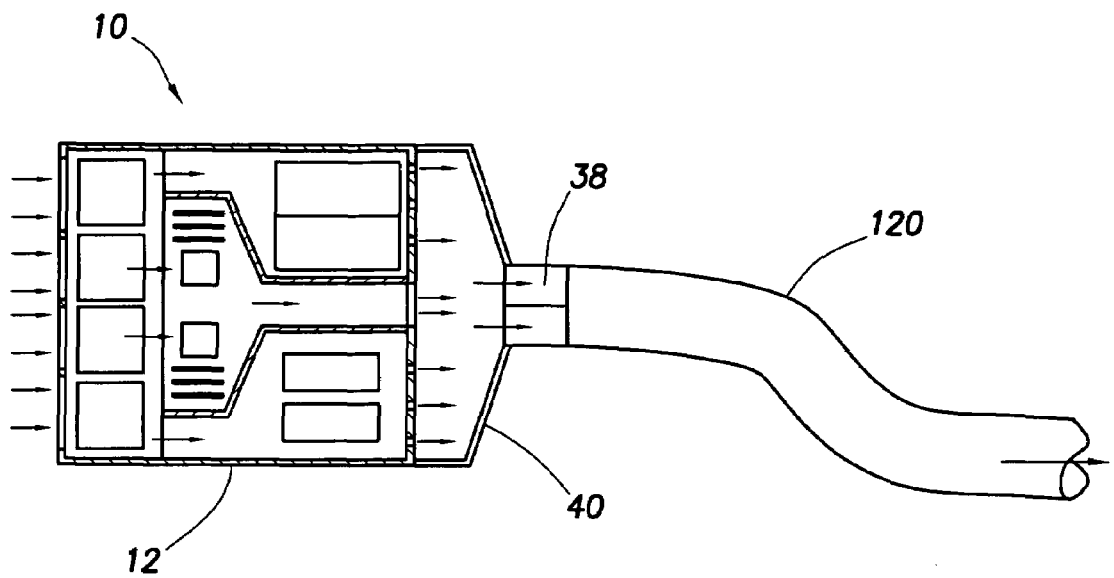
FIG. 5 shows a computer system constructed in accordance with embodiments of the invention.
Figure 6:
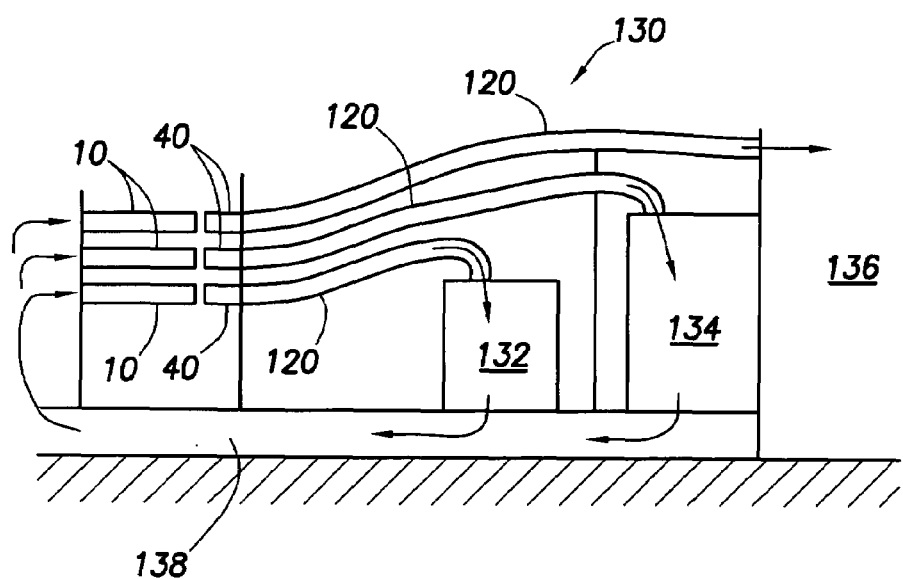
FIG. 6 shows an exhaust system constructed in accordance with embodiments of the invention.

As shown in FIG. 5, computer system 10 comprises chassis 12 with exhaust plenum 40 and air movers 38 connected thereto. Exhaust duct 120 is coupled to air movers 38 so as to channel the warm airflow generated by the air movers. Exhaust duct 120 allows the warm exhaust air to be isolated from the ambient air and transported to an air cooling system or otherwise moved away from system 10 so as not to interfere with the air being used to cool the system. Different options for handling this warm exhaust air are shown in FIG. 6 wherein data center 130 comprises a plurality of computer systems 10 and exhaust plenums 40. Exhaust ducts 120 can transport the warm exhaust to a computer room air conditioner (CRAC) 132 or to the buildings air conditioning system 134, both of which cool the air and return it to data center 130 via duct, or raised floor, 138. An exhaust duct 120 could also be used to exhaust the warm air to the environment 136 outside of the building housing data center 130.

Figure 7:
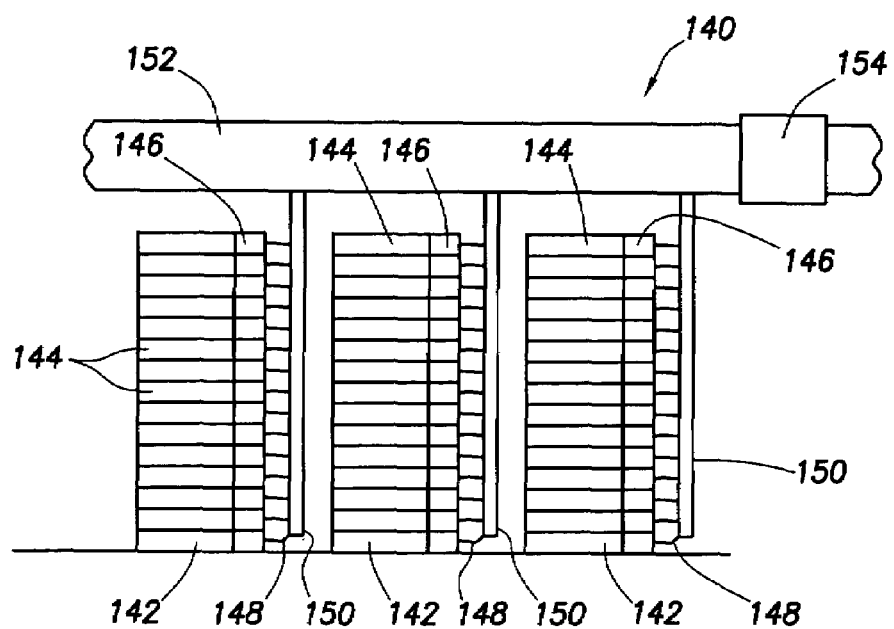
FIG. 7 shows a multiple computer exhaust system constructed in accordance with embodiments of the invention.

FIG. 7 illustrates an aggregated cooling system 140 for cooling a plurality racks 142 enclosing a plurality of fan-less computer systems 144. Cooling system 140 comprises collectors 146, manifolds 150, and compressor 154. Collectors 146 are coupled to computer systems 144 and collect the heated air from each computer system. Collectors 146 exhaust air through tubing 148 into manifolds 150 that direct the heated air into duct 152. The heated air is moved through duct 152 to compressor 154. The air is moved through computer systems 144 to an air cooling system (not shown) by compressor 154 or other air moving device that is capable of delivering the total volumetric flow and pressure requirements of the computer systems and cooling system. The air cooling system can be any type of air cooling or conditioning system that cools the air and returns it to computer systems 144, or the warm air may be exhausted to the environment and cool air supplied the computer systems by a separate air cooling system.

Figure 8:
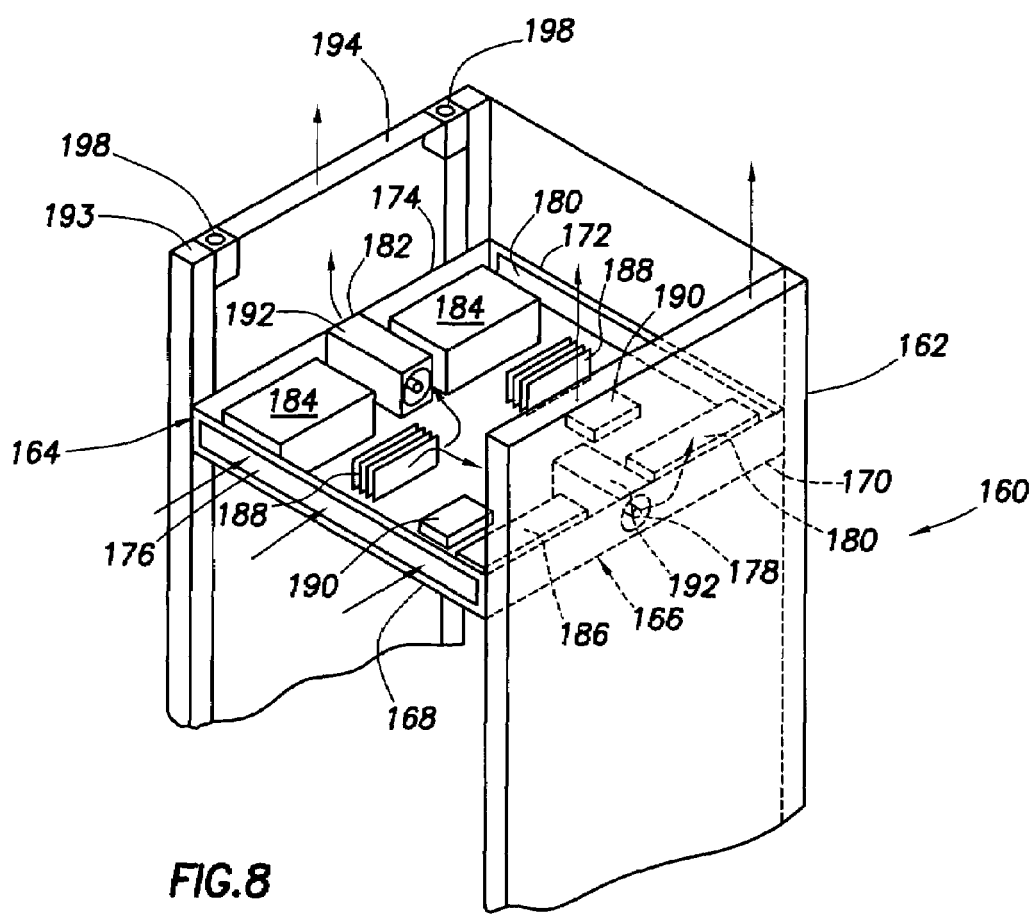
FIG. 8 shows a computer system and rack constructed in accordance with embodiments of the invention.

Referring now to FIG. 8, system 160 comprises rack 162 supporting computer system 164. Computer system 164 comprises chassis 166 having front end 168, back end 172, and sides 170, 174. Inlets 176 and 180 are disposed through front end 168 and back end 172, respectively. Outlets 178 and 182 are disposed through sides 170, 174, respectively. Computer system 164 comprises hard drives 184, power supplies 186, memory modules 188, processors 190, and air movers 192. Rack 162 comprises posts 193 supporting chassis 166. Ducts 194 are between posts 193 and are adjacent to, and in fluid communication with outlets 178 and 182. Although shown with two air movers, inlets, and outlets, in certain embodiments computer system 164 may comprise any number of air movers, inlets, and outlets.

Air movers 192 generate an airflow that is drawn into chassis 166 through inlets 176 and 180. The airflow passes in thermal communication with hard drives 184, power supplies 186, memory modules 188, and processors 190 before moving through outlets 178 and 182. The warm exhaust air moves upward through rack ducts 194 to the top of rack 162. Ducts 194 may further comprise integral air movers or other devices to ensure airflow upward from rack 162. Air movers 192 can also be separate from computer system 164 and disposed external to chassis 166 within rack 162. In certain embodiments, rack 162 may comprise air movers 198 disposed within ducts 194 so as to increase airflow through the ducts.

The placement of outlets 178 and 182 on sides 170 and 174 frees space available on front end 168 and back end 172. This free space allows for increased airflow and more hardware features at front end 168 and back end 172. Racks 160 also allow for denser packed data centers by eliminating the need to separate the inlets on one rack from the outlets of adjacent racks and the resultant hot aisle-cold aisle layout constraints. The placement of air movers 192 also allows for quieter operation because the air movers devices are buried within chassis 166, and can be acoustically isolated and dampened.

The above discussion is meant to be illustrative of the principles and various embodiments of the present invention. Numerous variations and modifications will become apparent to those skilled in the art once the above disclosure is fully appreciated. For example, it is understood that the airflow through a particular system can easily be reversed such that air flows in a direction opposite of the airflow described above. It is intended that the following claims be interpreted to embrace all such variations and modifications.

What is claimed is:

1. A computer system, comprising:
    a chassis supporting a processor, memory, and a power supply;
    an inlet that allows air to flow into said chassis;
    an outlet that allows air to flow out of said chassis;
    an air director disposed within said chassis, wherein said air director divides said chassis into a first flow area and a second flow area, wherein air flows through said inlet into the first flow area and then flows through the second flow area to said outlet; and
    an air mover operable to generate an airflow through said chassis between said inlet and said outlet and in thermal communication with the processor, memory, and power supply, wherein said air mover is disposed external to said chassis.

2. The computer system of claim 1 wherein said inlet is on a front end of said chassis and said outlet is on a back end of said chassis.

3. The computer system of claim 2 wherein said outlet comprises a plurality of exhaust ports in fluid communication with said air mover.

4. The computer system of claim 3 wherein the airflow through each of said plurality of exhaust ports is not identical.

5. The computer system of claim 3 further comprising an air director disposed within said chassis, wherein said air director divides the airflow into a plurality of streams and directs the streams toward said plurality of exhaust ports.

6. The computer system of claim 1 wherein said inlet and said outlet are on a front end of said chassis.

7. The computer system of claim 6 wherein the processor is disposed within the first flow area.

8. The computer system of claim 6 wherein the power supply is disposed within the second flow area.

9. The computer system of claim 6 further comprising an air director disposed within said chassis, wherein said air director directs airflow from a back end of said chassis to said outlet.

10. The computer system of claim 1 wherein said inlet is on a front end of said chassis and said outlet is on a side of said chassis.

11. The computer system of claim 10 further comprising a second inlet on a back end of said chassis.

12. The computer system of claim 10 further comprising a second outlet on an opposite side of said chassis.

13. The computer system of claim 1 further comprising an exhaust duct that captures the airflow from said outlet and provides fluid communication between said outlet and an air cooler.

14. A computer cooling system comprising:
    an air mover operable to generate an airflow through a chassis supporting a processor, memory, and a power supply, wherein said air mover is disposed outside of the chassis and wherein the chassis comprises a first side, a second side, a back end, and a front end with both an inlet and an outlet disposed therethrough; and
    an air director disposed within said chassis and operable to direct the airflow in thermal communication with the processor, memory, and power supply.

15. The computer cooling system of claim 14 wherein said air director divides the chassis into a first flow area and a second flow area, wherein air flows through the inlet into the first flow area and then flows through the second flow area to the outlet, wherein the processor is disposed within the first flow area and the power supply is disposed within the second flow area.

16. The computer cooling system of claim 14 wherein said air director directs airflow from the back end of said chassis to said outlet.

17. The computer cooling system of claim 14 further comprising an exhaust duct that captures the airflow from the chassis.

18. The computer cooling system of claim 17 wherein said exhaust duct provides fluid communication between the chassis and an air cooler.

19. A computer system comprising:
    a rack mounted chassis comprising a front end, back end, a first side, and a second side;
    a processor, memory, and a power supply disposed within said chassis;
    a first inlet disposed on the front end of said chassis;
    a second inlet disposed on one of the back end, the first side and the second side;
    a first outlet disposed on the first side of said chassis;
    an air mover operable to generate an airflow through said chassis between said first inlet and said first outlet; and
    a rack supporting said chassis, wherein said rack comprises flow channels disposed in fluid communication with said first outlet.

20. The computer system of claim 19 further comprising:
    a second outlet disposed on the second side of said chassis; and
    an air mover operable to generate an airflow through said chassis between said second inlet and said second outlet.

21. The computer system of claim 19 wherein the flow channels exhaust upward from said rack.

22. The computer system of claim 20 wherein said rack further comprises air movers disposed within said flow channels.

23. The computer system of claim 20, wherein the second inlet is disposed on the back end of said chassis.

* * * * *